United States Patent Office 3,205,519
Patented Sept. 14, 1965

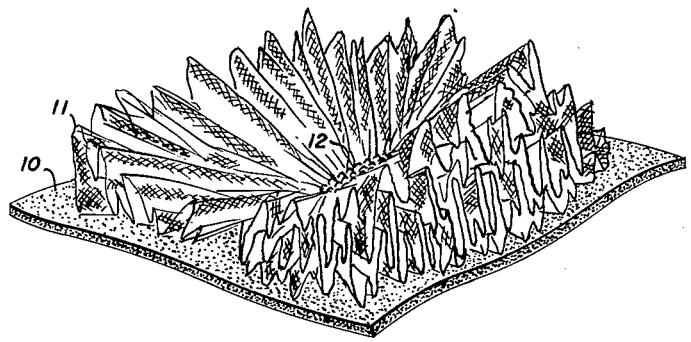
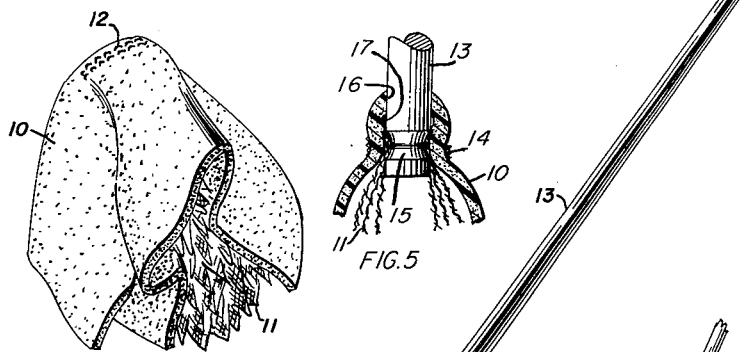
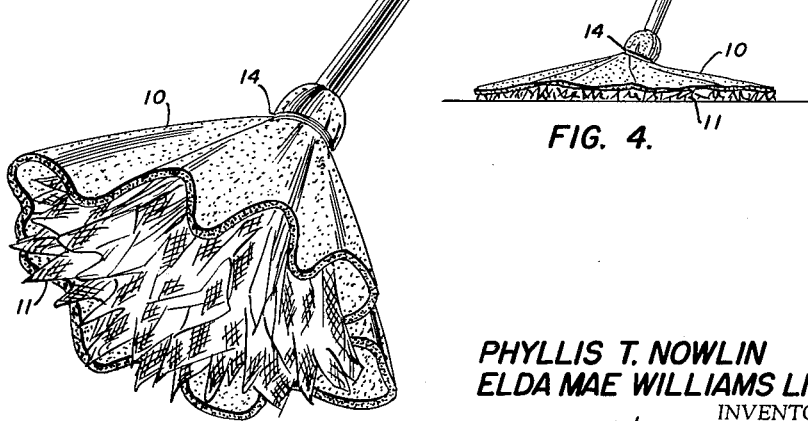

1

3,205,519
COMBINED WIPING AND SCOURING DEVICE
Phyllis T. Nowlin, 2804 Travis, and Elda Mae Williams Little, 6217 Kenwick, both of Fort Worth, Tex.
Filed Sept. 3, 1963, Ser. No. 306,160
2 Claims. (Cl. 15—118)

This invention relates to cleaning devices and has reference to a combined sponge and scouring element. As herein used, the word "sponge" has reference to soft absorbent material including many of the various synthetic resins such as polyurethane foam, and the term "scouring element" includes various flexible nets of relatively hard material such as nylon. Heretofore, scouring pads or the like have been made with a sponge or sponge-like center and covered with an abrasive mesh or net, but such pads were objectionable because of damage to the finger nails, were rough on the hands, and because small particles, such as coffee grounds and tea leaves, became lodged beneath the net and were difficult to remove.

An object of the invention is to provide a combined sponge and scouring net constructed and arranged wherein the net is received within the sponge when the device is in use.

Another object is to provide a combined sponge and scouring net so constructed and arranged that the sponge may be pressed into the net for removing moisture.

A further object is to provide a combined sponge and scouring net having free edges whereby the device may be opened and rinsed for removing foreign particles.

A particular object is to provide a cleaning device of the described class which will protect the user's hands and finger nails.

These and other objects of the invention will become apparent from the following description and the accompanying drawing in which:

FIGURE 1 is a perspective view of a preferred form of the invention.

FIGURE 2 is another perspective view of the preferred form of the invention, but showing the same in a cupped position for sponging moisture from the net.

FIGURE 3 is a perspective view of a modified form of the invention and including a mop handle.

FIGURE 4 is a reduced scale elevational view showing the modified form of the invention applied to a surface to be cleaned.

FIGURE 5 is a fragmentary cross-sectional view of the species of FIGS. 3, 4.

The form of the invention illustrated in FIGURES 1 and 2 is comprised of a layer of sponge 10 and a bunched scouring net 11 secured to the center of the sponge by threads 12. The illustrated sponge 10 is relatively thin. We have found that commercially available "sponge cloth" is suitable for the sponge portion of the invention and that ordinary nylon net is suitable for the scouring element. Although any desired size of sponge may be used, provided it is not too thick to carry out the squeezing operation, FIGURE 2, we have found that a rectangle four and one-half by six inches is suitable for most purposes. On a sponge 10 of that size we gather a thirty-six inch length of double nylon net to approximately two and one-half inches and stitch it to the sponge along the center line of its length. We refer to the surface of the sponge 10 adjacent the net 11 as the inner surface by reason of the cupped shape of the device when in use and when squeezing.

The form of the invention illustrated in FIGURES 3 and 4 includes a handle 13 to which the sponge 10 and net 11 are attached. The sponge 10 is preferably round and covers the net 11. The stitching or thread 12 may be eliminated and holes are formed in the sponge 10 and net 11 to receive one end of the handle 13. A cord or suitable ferrule 14 is then wrapped around the sponge 10 near the hole to secure the device in place. As shown in FIGURE 5, there is a groove 15 around the lower end of the handle 13, holes 16 and 17 in the sponge 10 and mesh 11. Thus, the ferrule 14 clamps and secures the mesh 11 and sponge 10 on the handle 13.

When using the first described form of the invention, the outer surface of the sponge 10 is cupped in the hand and the scouring element 11 is applied to the surface to be cleaned in the usual manner. The device is opened, as in FIGURE 1, for rinsing, and cupped and squeezed as in FIGURE 2 for removing moisture from the net. The form of the invention illustrated in FIGURES 3 through 5 is used in the manner of a mop. Like the first form of the invention, it may be easily rinsed and the moisture may be removed from the net 11 by squeezing the sponge 10.

The invention is not limited to the exemplary construction herein shown and described, but may be made in various ways within the scope of the appended claims.

We claim:

1. A combined wiping and scouring device comprising a relatively thin sponge pad having opposed flat surfaces, and at least one scouring element of bunched sheet mesh material secured inwardly of its free edges to one said surface of said sponge material, said sheet sponge material being of a size to completely receive said scouring element when cupped therearound, and wherein said scouring element is comprised of a gathered length of net material.

2. A cleaning device as defined in claim 1 and including a handle projecting from the side of said sponge opposite said scouring element.

References Cited by the Examiner
UNITED STATES PATENTS

| 1,872,791 | 8/32 | Nelson | 15—105 |
| 2,367,774 | 1/45 | Herbrick | 15—209 X |
| 2,759,209 | 8/56 | Ferrari | 15—223 X |
| 2,940,100 | 6/60 | Grossmeyer | 15—209 X |
| 2,964,772 | 12/60 | Crawford | 15—244.4 |
| 3,040,353 | 6/62 | Gray | 15—118 |
| 3,146,479 | 9/64 | Stoker | 15—118 |

FOREIGN PATENTS 1,233,600  5/60  France.

CHARLES A. WILLMUTH, *Primary Examiner.*